United States Patent
Ramsay

(10) Patent No.: US 11,184,723 B2
(45) Date of Patent: Nov. 23, 2021

(54) METHODS AND APPARATUS FOR AUDITORY ATTENTION TRACKING THROUGH SOURCE MODIFICATION

(71) Applicant: Massachusetts Institute of Technology, Cambridge, MA (US)

(72) Inventor: David Ramsay, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/846,300

(22) Filed: Apr. 11, 2020

(65) Prior Publication Data

US 2020/0329322 A1  Oct. 15, 2020

Related U.S. Application Data

(60) Provisional application No. 62/833,701, filed on Apr. 14, 2019.

(51) Int. Cl.
  *H04R 29/00* (2006.01)
(52) U.S. Cl.
  CPC .................... *H04R 29/00* (2013.01)
(58) Field of Classification Search
  CPC .......... H04N 11/00; G01H 3/14; G01H 3/187; H04R 29/00; H04R 3/005; H04R 3/04;
  (Continued)

(56) References Cited

U.S. PATENT DOCUMENTS 10,362,414 B2  7/2019  Lunner et al.

2015/0245156 A1*  8/2015  Tsang ................. H04S 7/30
                                                            381/17
(Continued)

FOREIGN PATENT DOCUMENTS

WO  WO-2018108284 A1 *  6/2018  ........... G11B 27/102

OTHER PUBLICATIONS

Christensen, C., et al., Ear-EEG-Based Objective Hearing Threshold Estimation Evaluated on Normal Hearing Subjects; published in IEEE Transactions on Biomedical Engineering, vol. 65, No. 5, May 2018.

(Continued)

*Primary Examiner* — Khai N. Nguyen
*Assistant Examiner* — Sabrina Diaz
(74) *Attorney, Agent, or Firm* — Daly, Crowley, Mofford & Durkee, LLP

(57) ABSTRACT

An auditory attention tracking system may modify external sounds in a manner that enables the system to detect, from EEG readings taken while a user listens to the modified sounds, which sound the user is paying attention to. Multiple microphones may record external sounds, and the sounds may be separated. A computer may modify one or more of the sounds, then remix the sounds, and then cause speakers to audibly output the modified, remixed sound. EEG measurements may be taken while the user listens to this modified sound. A computer may detect patterns in the EEG readings and may, based on the patterns, predict which external sound the user is paying attention to. The system may further modify the external sounds, to make the sound of interest more perceptually prominent. Or, based on the detected sound of interest, the system may modify a human-computer interaction.

20 Claims, 9 Drawing Sheets

(58) Field of Classification Search
CPC ... H04R 2225/41; H04R 2225/43; H04S 7/40; H04S 7/305; G10H 1/16; G10H 1/043; G10H 1/047; G10H 1/045; G10H 1/0091; G10H 2210/201; G10H 2210/215; G10H 2210/281; H03F 1/327; H03F 1/3276; G10K 15/10; G10K 15/12; H03G 3/001; H03G 3/002; H03G 3/00; H03G 1/0088; H03G 7/002; H03G 7/007; H03G 7/06; H03G 9/025; H03G 9/005; H04H 60/04; G06F 3/015; G06F 3/011; A61B 5/38; A61B 5/372; A61B 5/374; A61B 5/369; A61B 5/37; A61B 5/384
USPC .................. 381/56, 61, 62, 63, 104, 106
See application file for complete search history.

(56) References Cited

U.S. PATENT DOCUMENTS

| | | | |
|---|---|---|---|
| 2016/0080876 A1* | 3/2016 | Lunner | H04R 25/558 381/314 |
| 2018/0014130 A1* | 1/2018 | Lunner | A61F 11/06 |
| 2018/0184974 A1* | 7/2018 | Cimenser | A61B 5/291 |
| 2019/0066713 A1* | 2/2019 | Mesgarani | G10L 25/30 |
| 2019/0327570 A1 | 10/2019 | Pontoppidan et al. | |
| 2020/0005770 A1 | 1/2020 | Lunner et al. | |
| 2020/0077206 A1 | 3/2020 | Jensen et al. | |

OTHER PUBLICATIONS

Ciccarelli, G., et al., Comparison of Two-Talker Attention Decoding from EEG with Nonlinear Neural Networks and Linear Methods; published in Scientific Reports, vol. 9, Article 11538 (Aug. 8, 2019).

Hadler, S., et al., An Evaluation of Training with an Auditory P300 Brain-Computer Interface for the Japanese Hiragana Syllabary; published in Frontiers in Neuroscience, vol. 10, Article 446, Sep. 2016.

Miran, S., et al., Real-Time Decoding of Auditory Attention from EEG via Bayesian Filtering; published in 2018 40th Annual International Conference of the IEEE Engineering in Medicine and Biology Society (EMBC), Jul. 2018.

* cited by examiner

METHODS AND APPARATUS FOR AUDITORY ATTENTION TRACKING THROUGH SOURCE MODIFICATION

RELATED APPLICATIONS

This application claims the benefit of U.S. Provisional Application No. 62/833,701 filed Apr. 14, 2019 (the "Provisional").

FIELD OF TECHNOLOGY

The present invention relates generally to auditory attention tracking.

SUMMARY

In illustrative implementations of this invention, an auditory attention-tracking system modifies external sounds and presents them to a user in such a way as to enable the system to determine—based on EEG readings taken while the user listens to the modified sounds—which audio signal the user is paying attention to.

Put differently, a system may modify sounds from external sources, present the modified sound to a user, take EEG measurements of the user's neural response to the modified sound, and determine—based on the EEG measurements—which of the external sounds the user is paying attention to.

In some cases, the system includes multiple microphones that record external sounds. For instance, the microphones may be housed in over-the-ear earphones or earbuds or in the frame of eyeglasses, or in a small strip or headband worn by a user.

The recorded external sounds may be separated into different audio channels. For instance, the microphones may be directional and may be pointed in different directions, and each microphone may record a different audio channel of sound from a different direction. Or, for instance, the microphones may comprise a beamforming array, and beamforming may be performed to separate the external sounds into different audio channels that correspond to sound from different directions. Or, statistical or machine learning methods may be employed to separate the recorded external sounds into different audio channels, which may correspond to different sound sources or to different directions. For instance, sounds from two sources (e.g., a person's voice and the hum of an air conditioner) may come from the same direction and be separated by a sound separation algorithm. Or, for instance, sounds from different directions may be separated by a sound separation algorithm.

The separated audio channels may then be altered, in such a way as to enable the system to determine—based on EEG readings taken while the user listens to the altered sounds—which audio channel the user is paying attention to. These alterations to audio channels—in order to facilitate audio attention tracking based on EEG readings—may be achieved in a wide variety of ways. For instance, the dynamic range of at least one audio channel or at least one frequency band contained within that channel may be altered (e.g., by audio expansion or audio compression or by an audio limiter). For example, the dynamic range of a first audio channel may be briefly increased while the dynamic range of other audio channels is decreased. Or, for instance, the overall volume of at least one audio channel may be increased or decreased. For example, the overall volume of a first audio channel may be briefly increased while the overall volume of other audio channels is briefly decreased. Or, for instance, at least one audio channel may be equalized (e.g., by increasing or decreasing volume of sound in one or more audio frequency bands). For example, volume in a first frequency band may be briefly increased in a first audio channel while volume in that—or a different—frequency band is changed in other audio channels. Or, for instance, one or more audio channels may be altered by sound effects such as reverb or pitch shifting. In each case, the alteration of the audio channel(s) may be subtle and of short temporal duration, and may create an altered audio pattern that is not expected by the user. The alterations to the audio channels may be repeated in a temporal sequence.

The altered audio channels may then be remixed, and the remixed sound may be presented audibly to the user. For instance, speakers or other audio transducers in an earbud, earphone or hearing aid may output the remixed sound in a manner audible to the user. In some cases, the remixed sound is presented to both ears of a user, in such a way that the audio channels in the remixed sound presented to a user's right ear are different than the audio channels in the remixed sound presented to the user' left ear. For instance: (a) the audio channels in the remixed sound presented to the right ear may be altered versions of sounds from sound sources on the user's right side; and (b) the audio channels in the remixed sound presented to the left ear may be altered versions of sounds from sound sources on the user's left side.

In some cases, the remixed, altered sounds produced by the speakers overlays alterations on the external sounds in real time. In other cases, the speakers or other aspects of the acoustic system passively or actively cancel external noises and instead play a complete audio mix that is audible to a user.

The remixed, altered sounds that are played by the speakers may be processed by the user's auditory pathway. Neuronal activity in the user's cochlear nucleus, trapezoid body, superior olivary complex, lateral lemniscus, inferior colliculi, medial geniculate nucleus, primary auditory cortex, and ventral/dorsal auditory streams may all be affected by the sound presentation.

EEG measurements may be taken while a user listens to the remixed, altered sounds. The EEG readings may detect neural activity that arises in the user's auditory processing brain regions in response to the remixed, altered sounds. A computer may analyze these EEG readings to detect which sound the user is paying attention to. The modifications that are made to external sounds may be selected in such a manner as to elicit neural responses that are indicative of which sound the user is paying attention. In some cases, the modifications to a particular sound are unexpected by the user, and elicit a characteristic neural response if the user is paying attention to the particular sound.

In some cases, an alternation in an audio channel may elicit an event-related potential (ERP) in the user's brain. An EEG may record this ERP, and a computer may detect the ERP in the EEG reading. Based on the timing of the ERP and the timing of the alternation in the given audio channel, a computer may determine that the user is paying attention to the given audio channel. A particular, altered audio channel may include a temporal sequence of unexpected changes in the audio channel which in turn elicit a temporal sequence of ERPs in the user's brain. A computer may detect this sequence of ERPs in EEG measurements, and may conclude that the user is paying attention to the particular altered audio channel.

Alternatively or in addition, a computer may detect other patterns in the EEG signals and may, based on these detected patterns, determine which of the sounds the user is paying attention to. For instance, a computer may reconstruct audio features from EEG readings, and may compare these reconstructed features with features extracted from raw external audio sources. The computer may employ a wide variety of techniques (including Bayesian models, linear forward models, neural networks, and human neurophysiology-inspired models) to predict audio features such as cepstral features, envelopes, sub-band envelopes, or the audio stream itself. The computer may then compare these reconstructed features against the raw audio using techniques such as least mean squares, cross-correlation, cross-entropy, or projection of both EEG and audio into a shared space and assessing distance/correlation in this space. Or, for example, a trained machine learning model may take as inputs the altered, remixed sound presented to a user and the pattern of neural activity that is elicited by that sound, and may in real-time output a prediction of which audio channel in the remixed sound the user is paying attention to. The envelope of EEG readings (and/or other features) may be fed as inputs to the trained machine learning model. In some cases: (a) a trained machine learning model predicts a sound that elicits a particular detected pattern of neural activity; and (b) then the predicted sound is compared to different acoustic channels in the remixed sound to determine which audio channel the user is paying attention to.

The EEG electrodes may be housed in earbuds in the ear canal, earbuds in the external ear, over-the-ear earphones, over-the-ear earbuds, or hearing aids. Or, for instance, the EEG electrodes may be housed in eyeglass frames, or any strip or headband that the user wears on his or her head.

Once the system detects the audio channel of interest (i.e., the audio channel to which the user is paying attention), the system may employ this information in many different ways.

In some cases, the system uses this information to alter the audio channel of interest in order to make it easier to hear or to remember. Specifically, after detecting the audio channel of interest (i.e., the audio channel to which the user is paying attention), the system may modify the sounds that are being played by the speakers, in such way as to make the audio channel of interest easier to hear or to more memorable. For instance, the system may increase the volume of the detected audio channel of interest and may decrease the volume of other audio channels, thereby making it easier for a user to hear (and remember) the detected audio channel of interest. Or, for instance, the system may alter the dynamic range of the detected audio channel of interest in a first manner and may alter the dynamic range of other audio channels in a different manner, in such a way as to make it easier for a user to hear (and remember) the detected audio channel of interest. Likewise, the system may equalize the detected audio channel of interest in a first manner and equalize other audio channels in a different manner, in such a way as to make it easier for a user to hear (and remember) the detected audio channel of interest.

In some cases, active or passive noise control reduces the volume of original, unaltered sound that a user hears. For instance, an earbud or earphone in an ear canal or in an external ear of a user may passively muffle the original, unaltered sound from the user's environment. Or, for example, active noise control may be employed to cancel the original, unaltered environmental sounds. Speakers or other audio transducers (e.g., in earbuds, earphones or hearing aids) may output sound that is opposite in phase to the original, unaltered external sound in order to cancel that original sound. Reducing the original, unaltered sound may be advantageous. For instance, in a noisy restaurant, the system actively or passively cancel background noise, and may thereby make the audio channel of interest (to which the user is paying attention) easier to hear.

Alternatively or in addition, the system may detect which audio signal a user is paying attention to, and then gather data about the audio signal of interest. This data may then be employed in a wide range of HCI (human-computer interaction) applications, including context-aware computing and augmented reality. For instance, if the user pays attention to an audible conversation about flowers, then a computer may subsequently provide (e.g., by text in a visual screen or audibly with a chatbot) more information to the user about the types of flowers mentioned in the conversation. Or, for instance, if the user pays attention to an audible conversation about cars, then a computer may use an augmented reality (AR) program to overlay, on images of cars being viewed by the user, the names of the cars mentioned in the conversation. Or, for instance, immersive video content and virtual reality (VR) games may adapt or modify content to increase the likelihood that users attend to important elements of narrative or gameplay.

Alternatively or in addition, if a user is not paying attention to an audio signal that the user is likely to need to know, the system may detect this, and may later remind the user regarding pertinent information in the audio signal that the user ignored. For instance, if a user is not paying attention to a new person's voice when the new person introduces himself and provides his name, the system may detect this and may later reminder the user regarding the new person's name.

In some alternative implementations, a memory device stores an audio file that represents previously recorded and/or generated sound. In this audio file, audio channels may have been modified in such a way as to enable a system to determine—based on EEG readings taken while a user listens to the sound—which audio signal the user is paying attention to. For instance, the pre-recorded sound may be played to users at an amusement park. Based on EEG readings taken while the users listen, the system may determine which audio channel each user is paying attention to.

This invention is not limited to tracking attention. In some cases, a computer detects which sound has content that a user is committing to memory or is likely to remember.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

In illustrative implementations of this invention, a system modifies sounds from external sources, presents the modified sound to a user, takes EEG measurements of the user's neural response to the modified sound, and determines—based on the EEG measurements—which of the sounds the user is paying attention to.

In some implementations, sound sources are modified to in order to make it easier to detect—in EEG signal(s)—one or more of neural responses to the sound sources, in order to track user attention, engagement, or memory.

Figure 1:
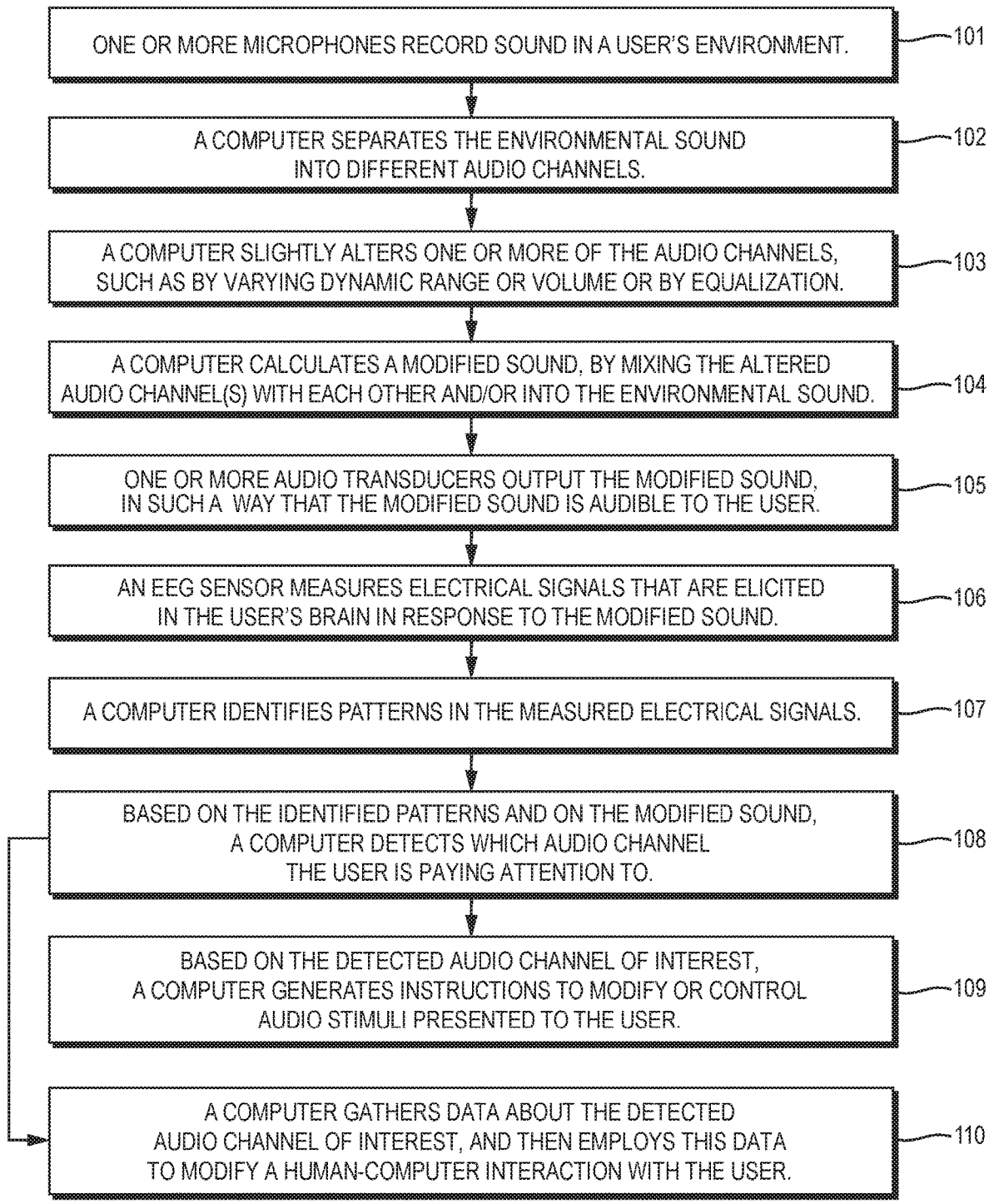
FIG. 1 is a flowchart of a method of auditory attention tracking.

FIG. 1 is a flowchart of a method of auditory attention tracking, in which modified sounds are presented to a user. In the example shown in FIG. 1, the method includes at least the following steps: One or more microphones record sound in a user's environment (Step 101). A computer separates the environmental sound into different audio channels (Step 102). A computer slightly alters one or more of the audio channels, such as by varying dynamic range or volume or by equalization (Step 103). A computer calculates a modified sound, by mixing the altered audio channel(s) with each other and/or into the environmental sound (Step 104). One or more audio transducers output the modified sound, in such a way that the modified sound is audible to the user (Step 105). An EEG sensor measures electrical signals that are elicited in the user's brain in response to the modified sound (Step 106). A computer identifies patterns in the measured electrical signals (Step 107). Based on the identified patterns and on the modified sound, a computer detects which audio channel the user is paying attention to (Step 108). Based on the detected audio channel of interest, a computer generates instructions to modify or control audio stimuli being presented to the user (Step 109). Alternatively or in addition, a computer gathers data about the detected audio channel of interest, and then employs this data to modify a human-computer interaction with the user (Step 110).

Each computer mentioned herein (e.g., in FIG. 1) may, for example, be a microcontroller, microprocessor, laptop or personal computer. Put differently, a microcontroller, microprocessor, laptop or personal computer are each a non-limiting example of a "computer", as that term is used herein. In some implementations, a computer performs or helps to perform sound separation, mixing, sound processing or signal processing. Alternatively, or in addition, one or more signal processors may perform or help to perform any sound separation, mixing, sound processing or signal processing described herein.

Hardware

Figure 2:
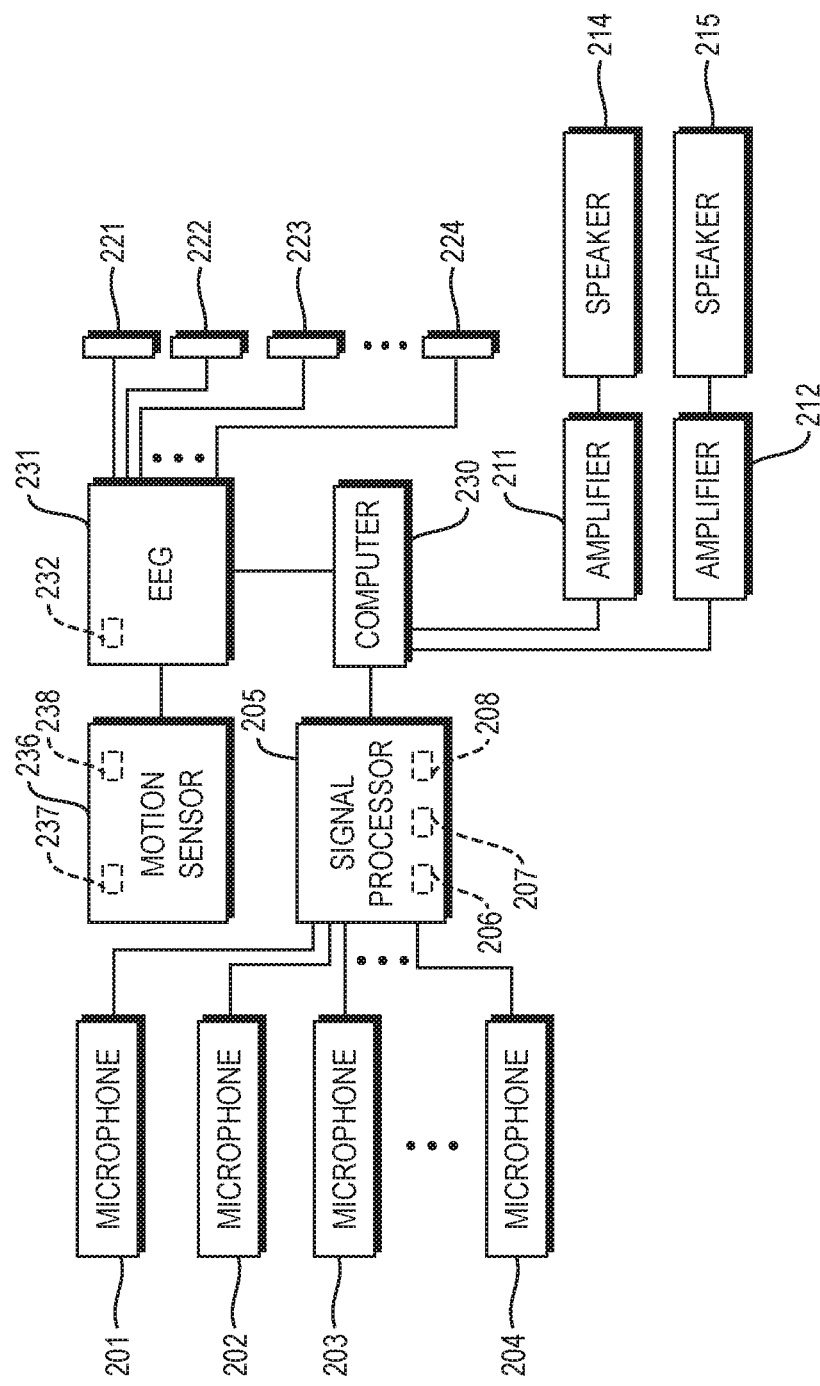
FIG. 2 shows a system that is configured to perform auditory attention tracking.

FIG. 2 shows a system that is configured to perform auditory attention tracking. In FIG. 2, the system includes multiple microphones (e.g., 201, 202, 203 204), a signal processor 205, EEG electrodes (e.g., 221, 222, 223 224), an EEG sensor 231, a computer 230, amplifiers 211, 212, audio transducers (214, 215), and a motion sensor 236.

Figure 9:
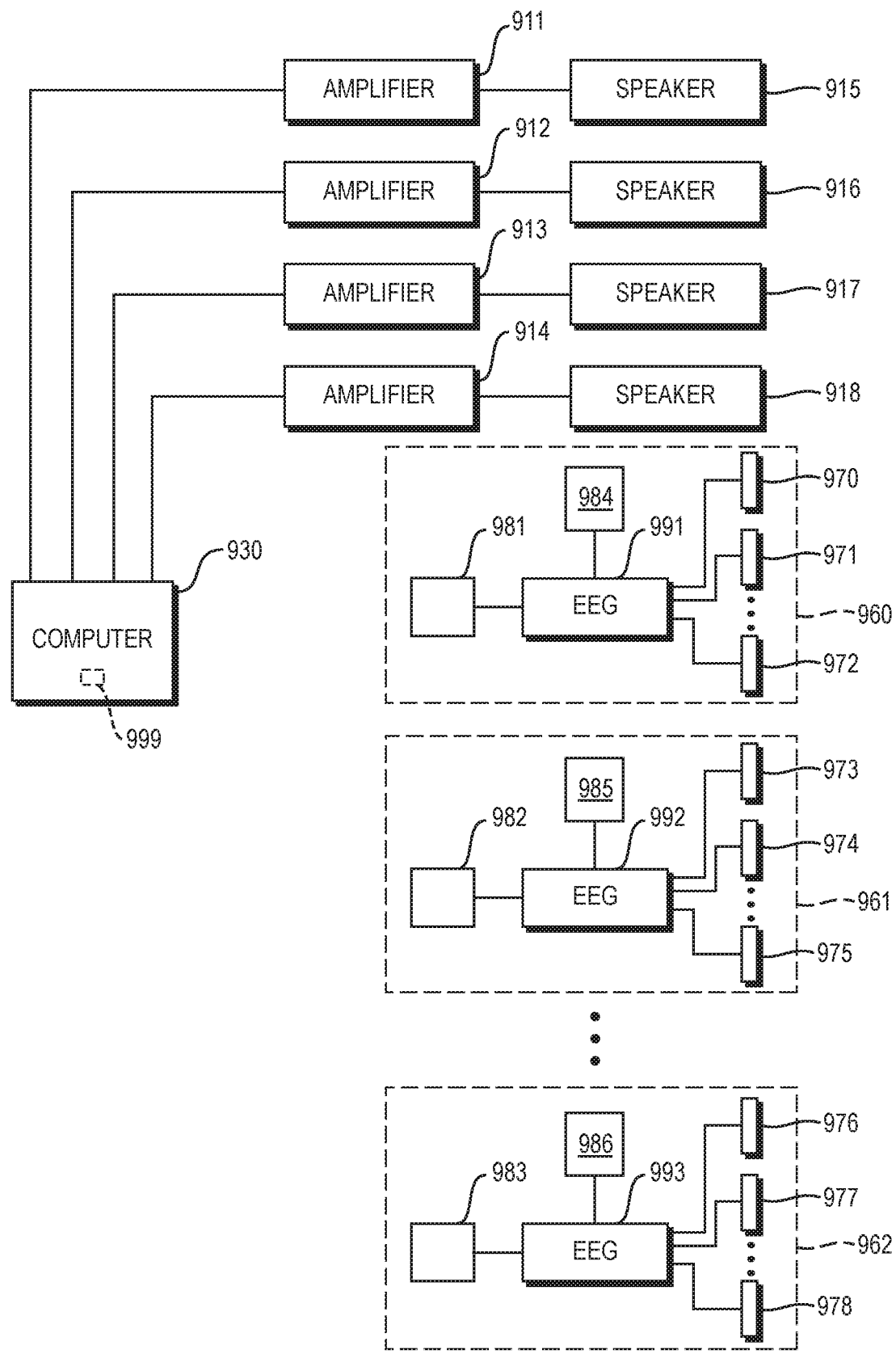
FIG. 9 shows hardware that may be employed for auditory attention tracking while playing stored audio files.

In FIGS. 2 and 9, the microphones may comprise directional microphones, positioned and oriented in such a way that the direction in which each microphone is most sensitive to sound is different. Each directional microphone may be most sensitive to sound from a different range of angles (e.g., a 2D arc or 3D solid angle). Each directional microphone may output measurements for a single audio channel. Alternatively, the microphones may comprise an audio beamforming array. Beamforming may be applied to measurements taken by this array, in order to calculate multiple different audio channels. The different audio channels produced by beamforming may emulate the respective audio channels that would be outputted by different directional microphones, each of which is most sensitive to sound from a different range of angles (e.g., different 2D arc or 3D solid angle).

In FIGS. 2 and 9, the microphones may be housed in or attached to any one or more of the following: (a) an eyeglasses frame; (b) headband; (c) hat or other object worn on the head; (d) necklace, collar or other object worn around the neck; (e) headphones (e.g., circum-aural or supra-aural headphones); (f) earphones that are not inserted into the ear canal; or (g) earbuds, earpieces, in-ear headphones, in-ear monitors or canalphones that are inserted into the ear canal. Alternatively, the microphones may be positioned in or on: (a) a pocket of clothing; (b) a table or other furniture; or (c) any other location in the user's environment.

In FIGS. 2 and 9, the microphones may comprise audio transducers that convert sound into an electrical signal. For instance, each of the microphones may be a dynamic microphone (e.g., with a coil of wire suspended in a magnetic field), a condenser microphone (e.g., which employs a vibrating diaphragm as a capacitor plate), or a piezoelectric microphone. Each microphone may include a preamplifier.

In FIG. 2, signal processor 205 performs audio signal processing and includes an amplifier 206, ADC (analog-to-digital converter) 207, and a microprocessor 208. The amplifier 206 may amplify analog signals from the microphones, to make them easier to detect. The ADC 207 may convert amplified, analog signals from the microphones into digital signals. Signal processor 205 may perform analog preprocessing, including one or more of the following steps: automatic gain control, equalization, dynamics, other sound effects, and filtering (e.g., anti-aliasing filtering, high-pass filtering, low-pass filtering or bandpass filtering). Microprocessor 208 may perform beam-forming or active noise reduction.

In FIGS. 2 and 9, EEG electrodes may be positioned at multiple positions on or in the user's head or neck. For instance, the EEG electrodes may be positioned in the user's ear canal or touching the user's skin at one or more of the following positions: (a) behind the ear (e.g., superficial to the mastoid process); (b) earlobe; (c) external ear; (d) scalp; (e) forehead; (f) face; or (g) neck. The EEG electrodes may include a ground or reference electrode. Voltages at the other EEG electrodes may be measured relative to the ground or reference electrode.

In FIGS. 2 and 9, the EEG electrodes may be housed in or attached to any one or more of the following: (a) eyeglasses frame; (b) headband; (c) hat or other object worn on the head; (d) necklace; (e) headphones (e.g., circum-aural or supra-aural headphones); (f) earphones that face but are not inserted into the ear canal; (g) in-ear headphones (or in-ear monitors or canalphones); or (h) earbuds or earpieces that are inserted into the ear canal.

In FIG. 2, an EEG sensor 231 processes electrical signals detected by the EEG electrodes. The EEG sensor may include signal processing circuitry that amplifies, filters or otherwise processes the EEG. (Alternatively, signal processor 205 may perform both audio signal processing and EEG signal processing).

In FIG. 2, an EEG sensor may include an ADC that converts analog EEG electrical signals to digital signals. A microprocessor 232 in the EEG sensor may take, as inputs, measurements by motion sensor 236, in order to remove artifacts in the EEG signal that are due to motion. Motion sensor 236 may include a three-axis digital accelerometer 237 that measures 3D acceleration and/or a three-axis digital gyroscope 238 that measures 3D angular orientation. Alternatively, motion sensor 236 may comprise an inertial measurement unit (IMU). Microprocessor 232 (in the EEG sensor) may, in addition to EEG artifact removal: (a) detect patterns in the EEG signals; and/or (b) calculate, based on the detected EEG patterns, which audio signal the user is attending to. Alternatively, in FIGS. 2 and 9, another computer (e.g., 230, 930) may perform one or more of the computational tasks described in the preceding sentence.

In FIG. 2, computer 230: (a) receives, from signal processor 205, data that represents audio measurements taken by the microphones; and (b) outputs instructions for speakers to produce sound that is audible to a human user. For instance, computer 230: (a) may cause a first amplifier/speaker pair (i.e., amplifier 211 and speaker 214) to produce sound audible in a user's right ear; and (b) may cause a second amplifier/speaker pair (i.e., amplifier 212 and speaker 215) to produce sound audible in the user' left ear. The speakers may comprise any type of audio transducer that converts electrical signals to acoustic signals. For instance, the speakers may employ one or more of the following technologies to output sound: (a) a moving coil driver (e.g., in which movement of a diaphragm is actuated by varying current in a coil of wire, where the coil of wire is attached to the diaphragm and is in a magnetic field created by a static magnet); (b) an electrostatic driver (e.g., an electrically charged diaphragm—such as a PET membrane—suspended between two electrodes); (c) an electret driver; (d) a planar magnetic driver; (e) a balanced armature sound transducer; (f) a Heil air motion transformer; (g) a piezoelectric film; (h) a ribbon planar magnetic driver; and (i) magnetostriction.

The speakers (e.g., 214, 215) may be located in an earpiece or headphone, or elsewhere on the body or in the environment. The speakers may generate pressure waves (sound waves) that travel through the air and that modify or replace external sounds that would otherwise enter a user's ear and vibrate the ear drum. Alternatively, the speakers may be bone conduction speakers that generate pressure waves (sound waves) that transmit through bone in the user's skull to the user's inner ear, bypassing air conduction and the ear drum. The speakers may passively block, reduce, or modify natural sound pathways. For instance, a speaker (e.g., 214, 215) may occlude an ear canal and may passively attenuate external sounds by blocking air conduction through the ear canal.

Computer 230 may perform beamforming, statistical methods or machine learning to separate external sounds into different audio channels, or may take as inputs different audio channels from different microphones or from beamforming. Computer 230 may modify one or of the audio channels (e.g., to make them easier to disambiguate in an EEG). Computer 230 may then mix the altered audio channels with each other and/or the external sounds to produce a mixed sound. Computer 230 may cause speakers (e.g., 214, 215) to output this modified sound in a manner that is audible to a human user.

Modifying External Sounds

In illustrative implementations of this invention, a system modifies sounds from external sources, presents the modified sounds to a user, takes EEG measurements of the user's neural response to the modified sounds, and determines—based on the EEG measurements—which of the sounds the user is paying attention to.

Figure 3A:
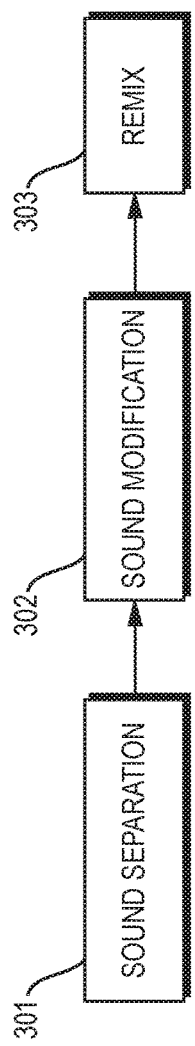
FIG. 3A is a flowchart of a method for modifying external sounds.

FIG. 3A is a flowchart of a method for modifying external sounds, in illustrative implementations of this invention. In the example shown in FIG. 3A, the method includes the steps of sound separation 301, sound modification 302 and remix 303. In one or more of these three steps (301, 302, 303), additional signal processing may be performed, including active noise reduction or other effects processing. For example, the manner in which external sound is separated at the sound separation step 301 may depend in part on a prediction of what will be heard. In some cases, this prediction is based on the currently detected audio channel of interest (i.e., the audio channel to which the user is paying attention) and on the sound modifications being currently applied.

In FIG. 3A, one or more microphones take analog measurements of external sounds and a signal processor converts these analog measurements into digital signals. A source separation algorithm may turn these digital signals into approximations of sound sources in the room.

In FIG. 3A, a sound modification algorithm alters one or more of the separated sound sources, in such a way as to make it easier to determine, based on EEG measurements taken while the user listens to the altered sounds, which of the sound sources the user is paying attention to. The modifications to the separated sound sources may be independent of the sound sources. For instance, one or more audio signals may be altered by random intervals of attenuation or by boosts to one or more of the audio signals. Alternatively, the modifications to the separated sound sources may depend on an analysis of the raw audio sources or predicted sources after some sound modification (e.g., differentially reinforcing aspects of each sound that might stand out in EEG signal(s), such as altering sub-band envelopes). Alternatively, the modifications to the separated sound sources may depend on predicted or measured changes in actual EEG signals. In each case mentioned in this paragraph, the modifications to the sound sources may be selected in such a way that the modified sounds will, when remixed and played to a user, elicit an neural response (e.g., an ERP) that may be detected in EEG signals and that is indicative of which sound source the user is paying attention to.

In FIG. 3A, the remixing step 303 recombines the sound sources to create signals that are fed to speakers in a playback system. In the remixing step 303, other signal processing (such as applying gain, equalization, changes to dynamic range, and/or other sound effects) may also be performed. The speakers may play modified sounds or may mix sound modifications with the live sounds from the environment. The playback system may also actively or passively reduce noise to minimize external sounds.

The sound separation may be performed by hardware, software, or both. The sound separation may involve beamforming techniques, or may leverage acoustic pickup patterns, or may employ signal statistics and/or predictions or modeling of sound sources. In some cases, after sound separation, the separated sources do not correspond directly to actual sources in the room. For instance, the sound separation algorithm may treat various angles and pickup patterns as virtual sources, selectively amplifying a particular pattern of directional sound capture over others. Beamformed sources may be head-locked (i.e. not have awareness of the room) or may instead be adjusted based on head-motion. Beamforming/directional cues may also inform statistical approaches to source separation. In the sound separation step, other signal processing (such as preprocessing, de-noising, or anti-aliasing) may be performed.

Once sounds are separated (e.g., based on beamforming, angle of arrival or based on other statistical or physical models), one or more of the individual audio signals may be modified. This modification may include one or more changes that improve the ability to ascertain—from one or more EEG signals—which of the separated signals is the object of a user's focus, attention, or memory. This modification stage may optionally include other audio processing on individual signals or groups of signals to support other functionality (for instance, to apply equalization or dynamic compression only to signals that are not of interest or to apply sound modifications to a prediction or measurement). Modifications to the sound may include volume and envelope modification, dynamics, equalization, or effects such as reverb and pitch shifting. During the sound modification, sound effects may be applied selectively to separate frequency bands and at different amplitudes. In some cases, perceptually relevant filtering is employed. For instance, audio signals may be filtered by gammatone filter banks, by bandpass filters with equivalent rectangular bandwidth (ERB), or by any other filter(s) that emulate or approximate a user's auditory perception or that emulate or approximate all or part of a user's auditory filter. In some cases, the sound modification algorithm involves a forward model that predicts the effect on event-related potentials (ERPs). This forward model may estimate the effect of the modified sound of various properties of the EEG itself (such as power spectrum coefficients or sub-band envelopes) or a reconstruction of audio features based on the EEG (such as cepstral coefficients or sub-band envelopes) and attempt to minimize/maximize these effects. These sound alteration algorithm may involve heuristics, a prediction or model of EEG response, or closed-loop iteration based on real measurements. The sound modification algorithm may be personalized to individuals.

The altered audio signals may be remixed and prepared for playback to the ear. The remixing may include linear combinations of each sound source to create an output signal for each speaker in the playback system. The remixing may also include overall effects, such as audio, compression, audio limiting, audio expansion, or equalization.

In some implementations, modified sounds are amplified and mixed-in over external, real-world sounds with low latency (e.g., latency of less than 5 milliseconds, or less than 20 milliseconds), so that the user perceives the alterations to be simultaneous with the external sounds. In other cases: (a) the real-world signal is eliminated or very substantially attenuated by passive or active noise attenuation; and (b) the modified, remixed audio is presented to the user with low latency (e.g., latency of less than 5 milliseconds, or less than 20 milliseconds), so that the user perceives the modified, remixed sound to be simultaneous with corresponding visual cues (e.g., visually perceived lip movements).

Figure 3B:
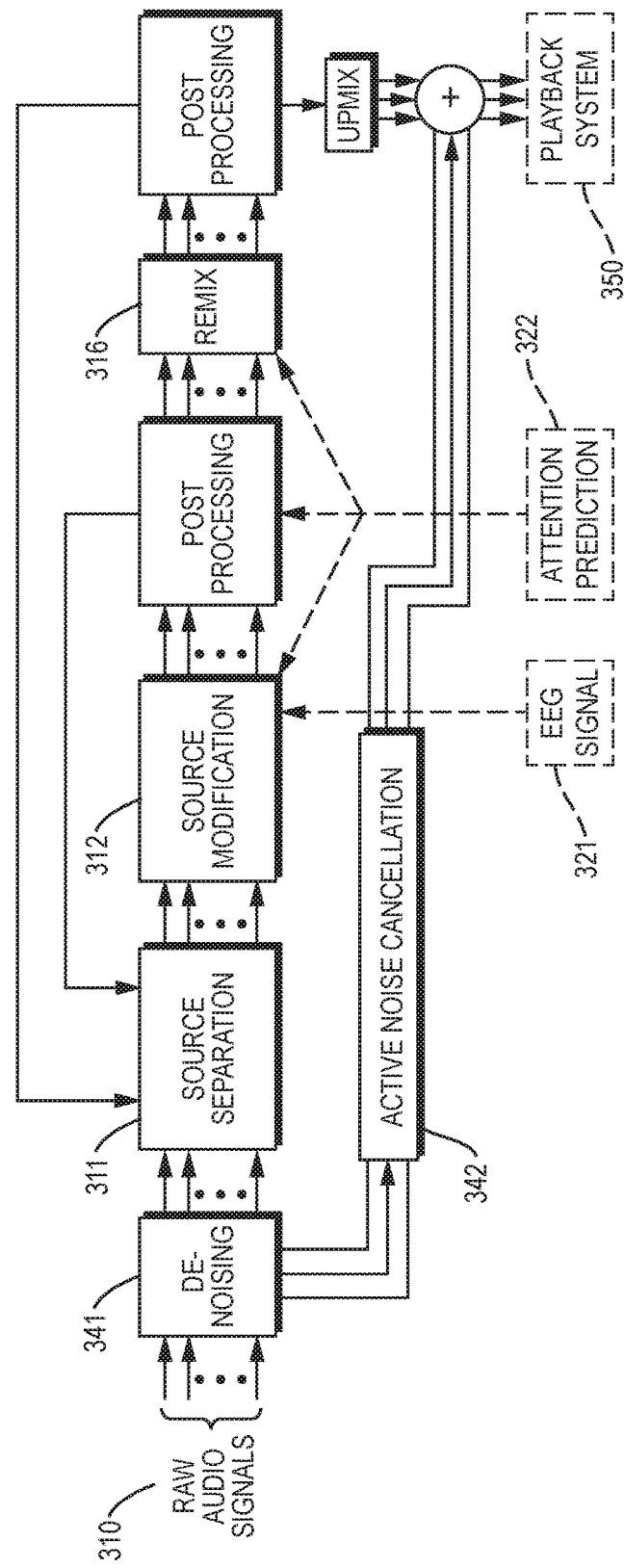
FIG. 3B is a flowchart of another method for modifying external sounds.

FIG. 3B is a flowchart of another method for modifying external sounds. This method may be employed, for example, in a hearing aid.

In the example shown in FIG. 3B, raw audio signals 310 (from microphones) are passed through a denoising 341 algorithm which denoises the audio signals. Then the audio signals are separated by a source separation 311 algorithm, which separates de-noised external sounds into sounds that correspond to actual, estimated or virtual sound sources. The source separation algorithm may predict sound sources that the use is hearing (after taking into account any augmentation of the audio signal of interest and any diminution or cancellation of other sounds that is performed by the system). For example, if two people are talking at the same time and at the same volume in a room, then: (a) the system may amplify the first voice, actively suppress the second voice and reduce background noise; and (b) the source separation algorithm may separate the external sounds into an amplified stream of the first voice, an attenuated stream of the second voice, and a background noise source.

In FIG. 3B, the separated sound sources may be modified by a source modification 312 algorithm. For instance, in some cases, these sound sources may be modified based on past trends in an EEG signal 321. Likewise, in some cases, these sound sources may be modified based on attention prediction 322 (e.g., in a manner that favors testing the signals that get paid attention to the most, since that may be fastest). Each source may then be individually processed (e.g., by varying dynamic ranges, audio effects, or equalization) before being mixed down (e.g., preferentially based on which has the user's attention), remixed 316 for playback, and again processed as a group (e.g., overall equalization, dynamic ranges, and audio limiting). The resulting mono signal may then be up-mixed to be played in concert over multiple audio speakers which comprise a playback system 350. The up-mixing process may involve linear transformations and dynamics processing to created separate audio signals for multiple audio speakers. In parallel, an active noise cancelation 342 algorithm may be running to eliminate or reduce noise. The method shown in FIG. 3B is a non-limiting example of this invention.

Unless the context clearly indicates otherwise, each "audio signal" or "audio channel" that is mentioned herein may be a digital or analog representation of sound. As used herein, an "analog representation" of sound is an analog electrical signal that encodes the sound. Unless the context clearly indicates otherwise, each reference herein (however worded) to modifying or processing a sound may refer to modifying or processing a digital or analog representation of the sound. Unless the context clearly indicates otherwise, each reference herein (however worded) to modifying or processing a sound source may refer to modifying or processing a digital or analog representation of: (a) sound from that source; or (b) sound that includes sound from that source. Likewise, unless the context clearly indicates otherwise, each reference herein (however worded) to separating sound may refer to: (a) separating an audio signal into multiple audio signals; or (b) extracting multiple audio signals from an audio signal. Similarly, unless the context clearly indicates otherwise, each reference herein (however worded) to separating sources of sound may refer to: (a) separating an audio signal into multiple audio signals that correspond to different sources of sound; or (b) extracting, from an audio signal, multiple audio signals that correspond to different sources of sound.

EEG Preprocessing

In some implementations, an EEG sensor performs EEG signal conditioning, including filtering and artifact removal, to remove noise and artifacts due to movement. For instance, filtering and artifact removal may be performed to eliminate or reduce: (a) EEG noise or artifacts due to movement, such as bodily movement, tongue and eye movement, and jaw movement; and (b) EEG noise or artifacts due to variation in electrode contact and impedance. In some cases, the EEG sensor includes an analog front-end that employs instrumentation amplifiers to produce a clean EEG signal. In some cases, filtering and/or artifact removal is performed by algorithms such as "chopper-stabilized" feedback algorithms implemented on a custom IC (integrated chip). In some cases, a software program removes EEG artifacts based on secondary measurements of motion, multi-channel statistical techniques, or predictive models that identify unlikely EEG signals. In some cases, noisy sections of the EEG signal are ignored. Alternatively, other techniques may be applied to remove artifacts and preserve the underlying signal.

In some implementations, EEG signals are combined (e.g., in a preprocessing step) to improve prediction of brain activity using inverse models and linear projection methods, neural networks, or other technique. In some cases, EEG processing is personalized for a particular user and adaptive based on patterns recognized in the particular user.

Figure 4:
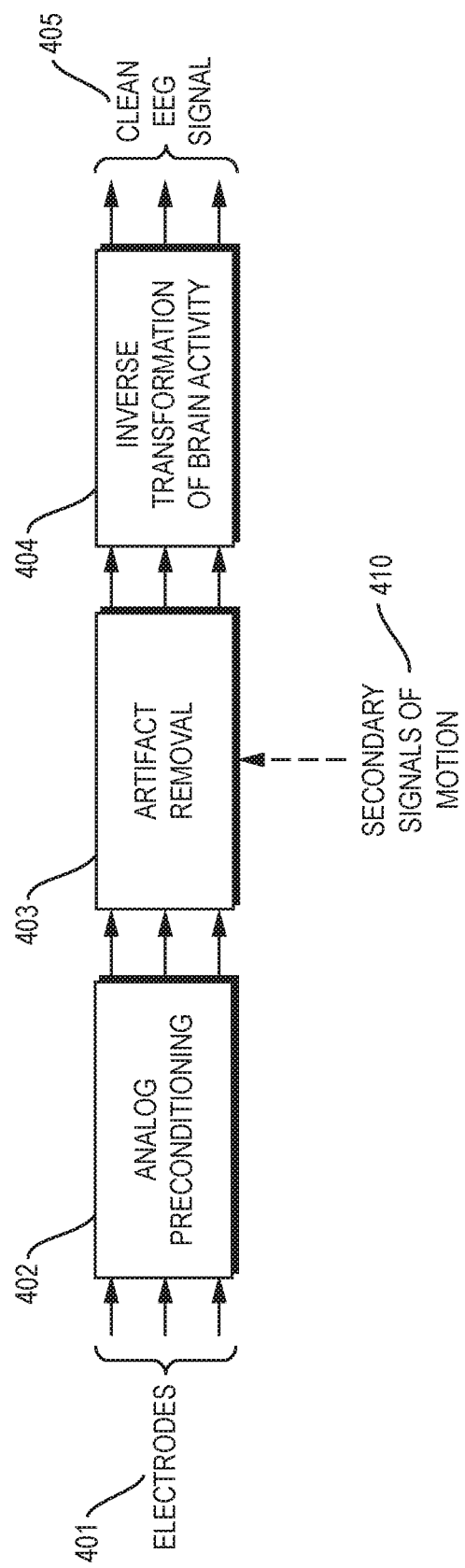
FIG. 4 is a flowchart of a method of EEG processing.

FIG. 4 is a flowchart of a method of EEG processing. In the example shown in FIG. 4, the method includes at least the following steps: Employ electrodes to measure EEG signals (Step 401). Perform analog pre-conditioning (Step 402). Perform artifact removal, to remove artifacts from the EEG signals (Step 403). The artifact removal algorithm may take, as inputs, data regarding secondary signals of motion 410 derived from measurements taken by an accelerometer and/or gyroscope. An inverse transformation of brain activity 404 may be employed. The EEG processing method may output a clean EEG signal 405.

Attention Prediction Algorithm

In some implementations, an algorithm predicts which sound source a user is paying attention to, or engaged in, or focusing on, or is likely to remember. For brevity, we sometimes call this an "attention prediction algorithm", even though it may predict attention, engagement, focus, and/or memory.

In some cases, the attention prediction algorithm: (a) analyzes a conditioned EEG signal (after the EEG processing described above), based on knowledge of sound sources and/or modifications to the sound; and (b) outputs a prediction regarding which sound source the user is paying attention to, engaged in, focused on, or is likely to remember.

The attention prediction algorithm: (a) may take as inputs (i) raw separated sounds, applied modifications to the sounds, the modified sounds, and/or a prediction of heard or perceived sound; and (ii) the EEG conditioned data; and (b) may output a prediction of attention or memorability for one or more of the separated sound signals.

In some cases, the attention prediction algorithm is an ERP-based algorithm, in which modifications of source sounds are expected to elicit or alter event-related potentials (ERPs) in predictable ways. In this approach, unexpected sound modifications are interjected repeatedly into sound presented to the user, and the EEG response to these repeated sound modifications is split and time-averaged. Increasing the number of time intervals that are averaged (e.g., by shortening the time intervals) may tend to improve SNR (signal-to-noise ratio). The sound modifications may be perceived by a user as unexpected, and may elicit changes in amplitude in electrical brain activity in the user, which in turn may cause changes in amplitude in the EEG signal. At least some of these changes in electrical brain activity may comprise P300 ERPs. Each of the P300 ERPs may peak approximately 250 to 500 milliseconds after the onset of a modified sound that elicits the P300, and may be indicative of onset of a sound to which the user is paying conscious attention. Also, at least some of the changes in electrical brain activity may comprise N100 negative peaks that occur approximately 80 to 120 milliseconds after onset of a modified sound that elicits the N100 and that are indicative of a user's response to an unexpected sound. In some cases, changes in peak/average amplitude, onset time, frequency characteristic, or signal envelope (e.g., a negative peak 50-150 ms after onset of the modified sound or a positive peak 250-450 ms after the onset) may be used to identify the strength of attention to the signal which has been modified versus others. In some cases, these predictions are filtered through a state-space model to ensure reliability across time. Or, in some cases, multiple individual signals are time-averaged for each prediction. For instance, the attention predication algorithm may calculate the average P300 amplitude elicited by the last 10 modifications as a prediction of attention paid, which effectively averages the attention prediction across the time taken to make 10 modifications.

Figure 5:
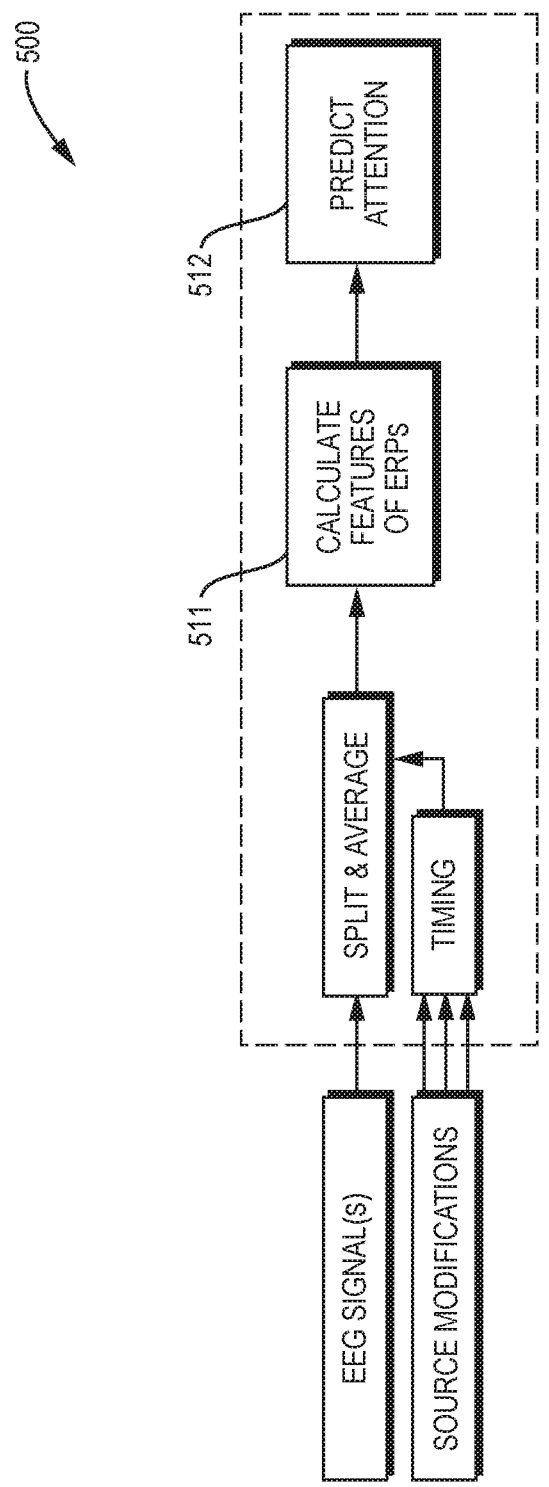
FIGS. 5, 6 and 7 are each a flowchart of a method for attention prediction.
Figure 6:
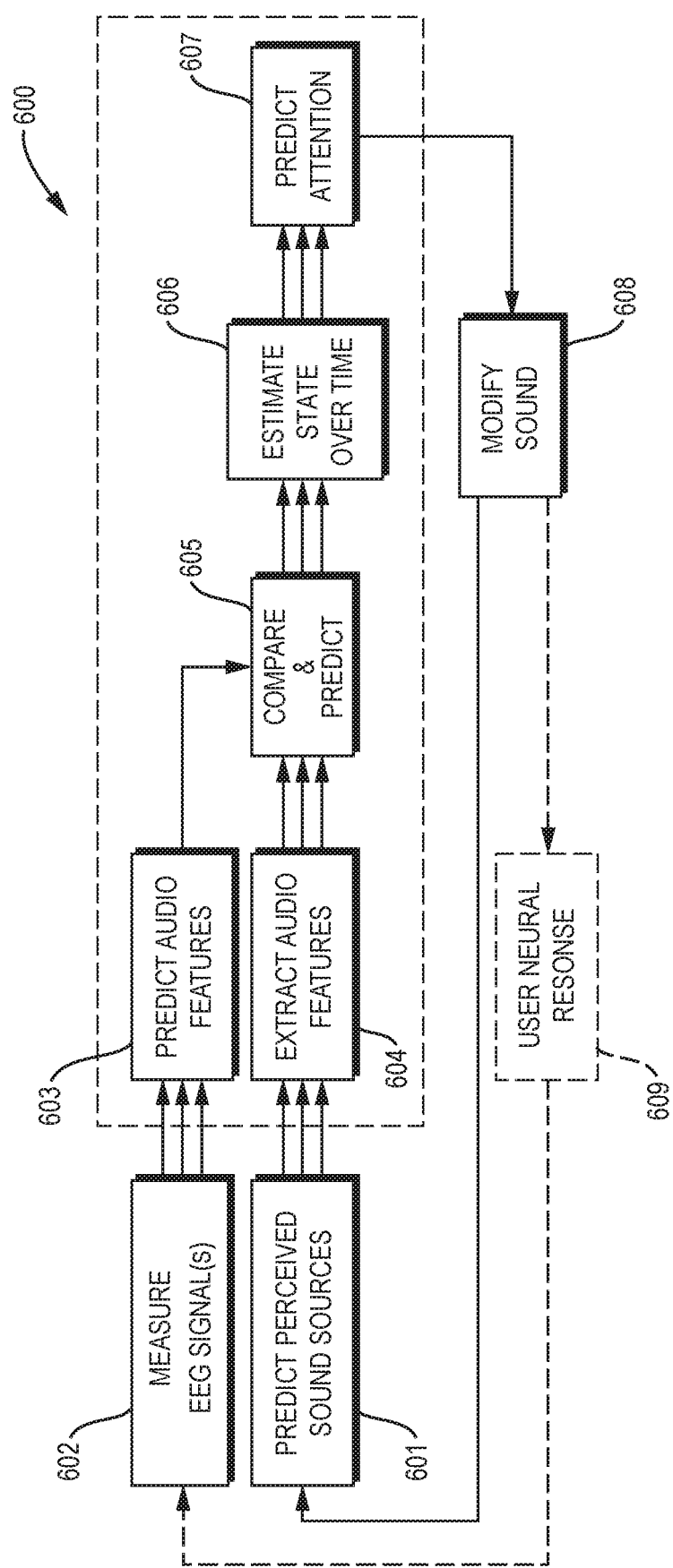
Figure 7:
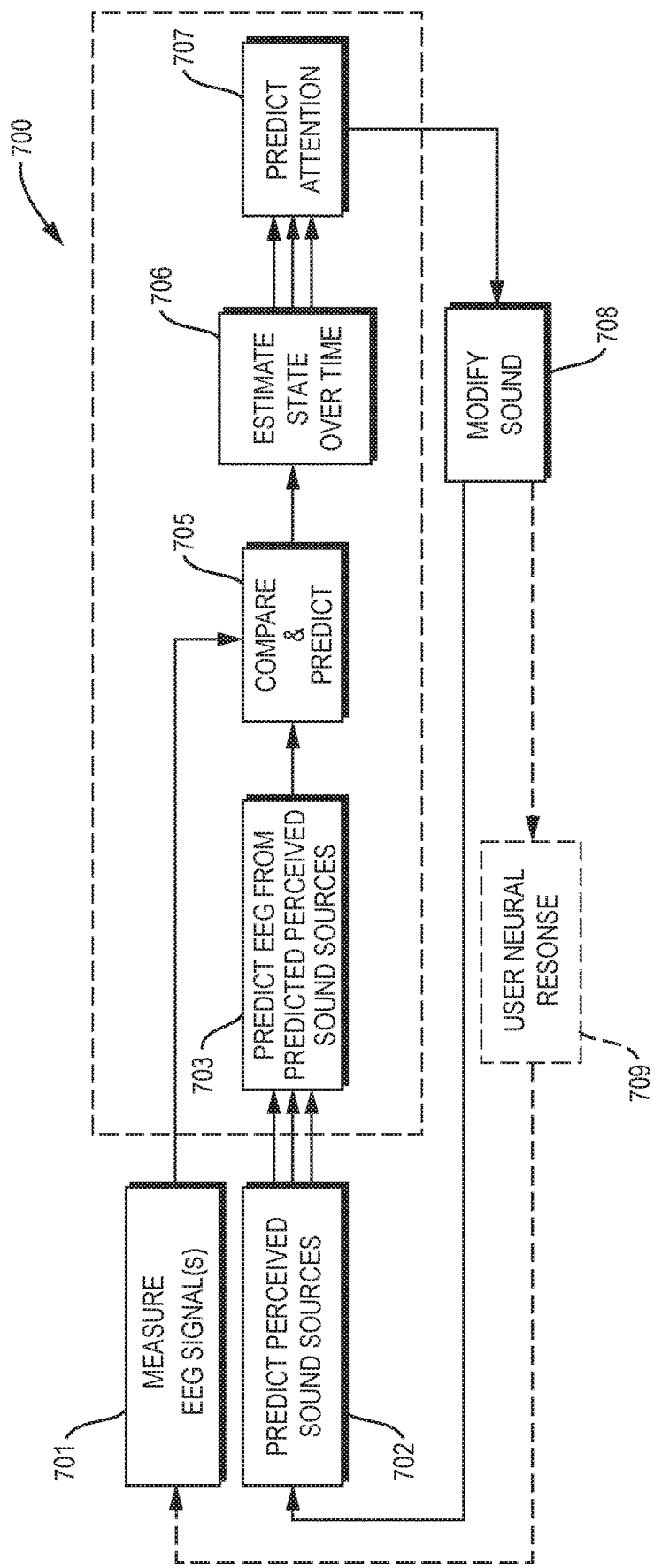

FIGS. 5, 6 and 7 are flowcharts that show examples of attention prediction algorithms (i.e., algorithms 500, 600, and 700, respectively).

FIG. 5 shows an example of an attention prediction method that predicts which sound a user is paying attention to, based on ERPs elicited by modifications to external sounds. In the example shown in FIG. 5, EEG signals are split into multiple time intervals and EEG amplitude in different time intervals is averaged. In FIG. 5, the timing of onset of modified sounds that are audibly presented to a user is compared to timing of changes in the EEG signal, to detect which changes in EEG signals are caused by the sound modifications and with what latency. Based on this analysis, features of ERPs 511 are calculated, and the sound source to which the user is paying attention is predicted 512.

Alternatively, in some implementations, the attention prediction algorithm predicts one signal (EEG or audio) from the other, compares them, and uses this to update an estimate of attention predictions over time. This prediction technique may output an accurate prediction with only a single pass through the model. This prediction technique may include techniques such as Bayesian models, linear forward models, neural networks, and human neurophysiology-inspired models (among others) used to predict audio features such as cepstral features, envelopes, sub-band envelopes, or the audio stream itself. These reconstructed features may then be compared against the raw audio using techniques such as least mean squares, cross-correlation, cross-entropy, or projection of both EEG and audio into a shared space and assessing distance/correlation in this space, among others. These instantaneous predictions may be fed into a state-space model, for example an HMM (hidden Markov model), which may predict the user's likely attentional state given noisy observations over time.

In other implementations, the prediction algorithm instead predicts the EEG signals from the sound sources and from an estimate of what the user is paying attention to. This latter approach (predicting EEG signals from sound sources) may need to be run and compared multiple times forward, each with a different prediction of attention, making it more computationally expensive than the approach described in the preceding paragraph. However, it may achieve a very similar outcome as the approach described in the preceding paragraph.

In yet other implementations, an attention prediction algorithm maps and/or compares the raw EEG signals without a transformation step. In this approach, the algorithm may calculate cross entropy or may build a model that accepts raw signals and predicts attention using (for instance) a neural network or Bayesian techniques. In this approach, neither the audio nor the EEG has a prediction step; either may, however, have a feature extraction step.

A user's attention may switch quickly; and sources may also change rapidly, especially if they are beamformed 'virtual' pseudo-sources. The attention prediction algorithms may run continuously or intermittently depending on the scenario. Selection of which sound(s) to modify to improve prediction quality may preferentially boost SNR for some sounds over others on short time scales. Thus optimal search strategies and prior predictions over likely sources of interests may improve these techniques.

Modification of sound sources may be distracting. Thus, how frequently sound sources are modified may depend on the subtlety of the modification and the challenge of an environment. In illustrative implementations, sound modification (in order to identify which sound the user is paying attention to) is well-suited for multisource sound environments and/or sound environments in which attention may shift quickly and in which it is desirable to detect in real time these quick shifts in attention. In these use scenarios, the sound modifications may be made continuously (or repeatedly at very short time intervals) with varying degrees of subtlety. Or, for instance, the sound modifications may be performed in bursts to bolster prediction only when attentional state is uncertain (e.g., upon entering a new environment), when a transition of attention is expected, or when the environment is especially challenging.

In the examples shown in FIGS. 6 and 7, the system has been operating for a while and has already: (a) predicted which external sound the user is paying attention to; (b) augmented that sound perceptually (e.g., by amplifying it); and (c) diminished the perceptual impact of other external sounds (e.g., by noise cancellation). For instance: (a) a user may be sitting in a noisy restaurant talking to two friends; and (b) the system may have already (i) detected that the user is paying attention to the first friend's voice, (ii) amplified the first friend's voice, (iii) diminished the volume of the second friend's voice, and (iv) actively canceled background noise.

FIGS. 6 and 7 illustrate how the system—even after it has been operating for a while and has already made predictions of attention—may continue to monitor the user's EEG readings and continue to make new predictions regarding which sound the user is paying attention to. This may enable the system to quickly revise predictions of attention, as the user's attention shifts rapidly from one sound to another.

In FIG. 6, an attention tracking system has already modified sounds 608 based on predictions of attention (e.g., by amplifying the sound of interest and by reducing the volume of other external noises). In FIG. 6, the system frequently updates its prediction of attention and (to the extent needed due to a change of attention) revises how it modifies sounds that are presented to the user. In FIG. 6, the system achieves these updates by comparing (a) audio features predicted from EEG readings; and (b) audio features extracted from predictions of which sounds the user is perceiving. Specifically, in FIG. 6, the system measures EEG signals 602. Based on the measured EEG signals, a computer predicts a first set of audio features that the computer predicts the user is attending to 603. Concurrently, a computer predicts which sound sources a user is perceiving 601, based in part on how the system is already modifying sounds being played to the user. A computer extracts a second set of audio features from these predicted perceived sounds 604. A computer then compares the audio features predicted from EEG signals with the audio features of the predicted perceived sounds, and makes a new estimate 605 regarding which sound the user is attending to. Specifically, if these two sets of audio features match each other, then the computer: (a) may determine that the current prediction of attention is accurate; and (b) may output a new estimate of attention which is the same as the current prediction. However, if these two sets of audio features do not match each other, then the computer: (a) may determine that the current prediction of attention is no longer accurate; and (b) may output a new estimate of attention which is different than the current prediction. For instance, the computer may conclude that the audio features predicted from EEG signals match audio features of a different sound, and may estimate that the user is now paying attention to the different sound. This process may be quickly iterated while the system makes repeated estimates regarding which sound the user is paying attention to. Put differently, the system may estimate the state of the user's attention at multiple times in a temporal sequence 606. The computer may: (a) take as inputs multiple estimated states of attention during a recent temporal interval; and (b) output a new prediction of which sound the user is paying attention to 607. For example, the system may predict which sound the user is paying attention to, based on the most recent ten estimates of attention that have occurred in a short time interval (e.g., by ignoring outliers in the ten most recent estimated attentional states and/or by selecting the attentional state that was estimated the most times). Based on the new prediction of attention, a computer may output instructions that change how speakers modify sound 608 that is presented to a user. For instance, if the user has switched attention from a first voice to a second voice, the computer may cause the speakers to amplify the second voice, to diminish the volume of the first voice, and to cancel background noise. A change in how the sounds are modified may elicit a change in the user's neural response 609 to the modified sounds, which in turn may alter the EEG signals that are measured 602. The overall process that is described in this paragraph (and shown in FIG. 6) may be repeated frequently while the attention tracking system is operating.

Similarly, in FIG. 7, an attention tracking system has already modified sounds 708 based on predictions of attention (e.g., by amplifying the sound of interest and by reducing the volume of other external noises). In FIG. 7, the system frequently updates its prediction of attention and (to the extent needed due to a change of attention) revises how it modifies sounds that are presented to the user.

In FIG. 7—unlike FIG. 6—the system achieves these updates by comparing (a) actual EEG signals; and (b) EEG signals that are predicted from predicted perceived sounds. Specifically, in FIG. 7, the system measures EEG signals 701. Concurrently, a computer predicts which sound sources a user is perceiving 702, based in part on how the system is already modifying sounds being played to the user. A computer then predicts EEG signals that would occur if a user paid attention to each or multiple of the predicted perceived sounds 703. A computer then compares a first set of EEG signals to a second set of EEG signals, where the first set are the actual measured EEG signals and the second set are the predicted EEG signals that would result from the user paying attention to the predicted perceived sounds. Based on this comparison, the computer makes a new estimate 705 regarding which sound the user is attending to. Specifically, if these two sets of EEG signals match each other, then the computer: (a) may determine that the current prediction of attention is accurate; and (b) may output a new estimate of attention which is the same as the current prediction. However, if these two sets of EEG signals do not match each other, then the computer: (a) may determine that the current prediction of attention is no longer accurate; and (b) may output a new estimate of attention which is different than the current prediction. For instance, the computer may conclude that the actual EEG signals match the predicted EEG signals that would result from paying attention to a different sound, and may estimate that the user is now paying attention to the different sound. This process may be iterated while the system makes repeated estimates regarding which sound the user is paying attention to. Put differently, the system may estimate the state of the user's attention at multiple times in a temporal sequence 706. The computer may: (a) take as inputs multiple estimated states of attention during a recent temporal interval; and (b) output a new prediction of which sound the user is attending to 707. For example, the system may predict which sound the user is paying attention to, based on the most recent ten estimates of attention that have occurred in a short time interval (e.g., by ignoring outliers in the ten most recent estimated attentional states and/or by selecting the attentional state that was estimated the most times). Based on the new prediction of attention, a computer may output instructions that change how speakers modify sound 708 that is presented to a user. For instance, if the user has switched attention from a first voice to a second voice, the computer may cause the speakers to amplify the second voice, to diminish the volume of the first voice, and to cancel background noise. A change in how the sounds are modified may elicit a change in the user's neural response 709 to the modified sounds, which in turn may alter the EEG signals that are measured 701. The overall process that is described in this paragraph (and shown in FIG. 7) may be repeated frequently while the attention tracking system is operating.

Attention Tracking with Stored Audio Files

In some implementations, stored audio files include modified sounds that have been altered in a manner that facilitates attention tracking. When the stored audio files are played to users, EEG measurements may be taken of their brains' responses. These EEG measurements may be analyzed, to determine which sound each user is paying attention to.

In some cases, this approach (of playing back a stored audio file with sound modifications that facilitate attention tracking) may be employed in entertainment settings such as amusement parks, concerts, immersive media, or theaters. In these cases, a curator might control the sound sources in the environment directly, and desire to manipulate or track audience attention.

In some cases, sound modifications to ease attentional tracking is made before the user's experience and saved in a recording that will be played back during the experience. Sources may be modified once, off-line after testing with an individual or individuals, to make them most easily discernible by the EEG. These modifications may be based on closed-loop measurements using EEG, a prediction of EEG, or other heuristics. The modifications may also happen at regular intervals or continuously.

Attention may be tracked for individuals or groups, and crowd level attention may be analyzed. Crowd level features may also be used to help predict and model individuals or build models of user attention during that experience with strong priors. Data from multiple people may enable robust, multi-user predictions of attention.

This information may be used to improve and iterate on the design of the experience (so more people are deeply engaged) or to drive novel in-the-moment interactions with a user or users based on how they are interacting with the experience, space, or exhibit.

In this approach (of playing back a stored audio file with sound modifications that facilitate attention tracking), one or more loudspeakers that are not worn by users may play audio that has been modified to make it easier to detect attention using EEG. Users may listen to this audio. Each user may wear an EEG headset that sends EEG data or an attention prediction to a central computer by wireless or wired communication. Alternatively, in other versions of this approach, the sounds that are presented to the user are known in advance, and the user wears a device that stores pre-saved files for attention prediction with respect to those known sounds.

Figure 8:
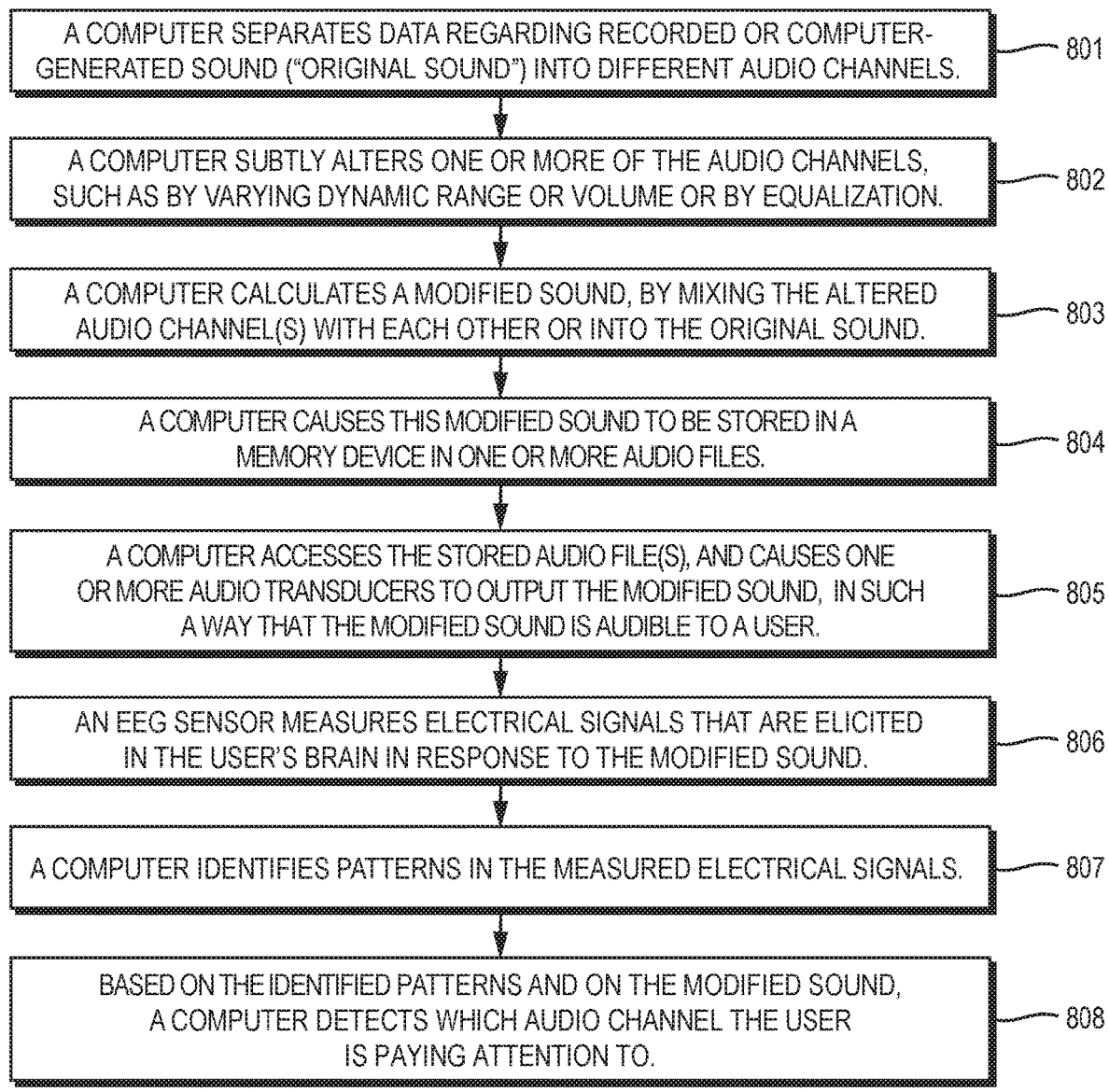
FIG. 8 is a flowchart of a method of auditory attention tracking, in which audio channels in a stored audio file have been altered to facilitate EEG detection of an audio channel of interest.

FIG. 8 is a flowchart of a method of auditory attention tracking, in which audio channels in stored audio files have been altered to facilitate EEG detection of an audio channel of interest. In the example shown in FIG. 8, the method includes at least the following steps: A computer separates data regarding recorded or computer-generated sound (original sound) into different audio channels (Step 801). A computer subtly alters one or more of the audio channels, such as by varying dynamic range or volume or by equalization (Step 802). A computer calculates a modified sound, by mixing the altered audio channel(s) with each other and/or into the original sound (Step 803). A computer causes this modified sound to be stored in a memory device in one or more audio files (Step 804). A computer accesses the stored audio file(s), and causes one or more audio transducers to output the modified sound in such a way that the modified sound is audible to a user (Step 805). An EEG sensor measures electrical signals that are elicited in the user's brain in response to the modified sound (Step 806). A computer identifies patterns in the measured electrical signals (Step 807). Based on the patterns in the electrical signals and on the modified sound, a computer determines which audio channel the user is paying attention to (Step 808).

FIG. 9 shows hardware that may be employed for auditory attention tracking while playing stored audio files. Sounds in the stored audio files may have been modified (before being stored) in such a way as to facilitate auditory attention tracking by EEG readings. In FIG. 9, a computer 930 causes the stored audio files to be played audibly to users. To do so, computer 930 causes amplifiers 911, 912, 913, 914 and loudspeakers (915, 916, 917, 918) to output the modified sound that is stored in the audio files. This modified sound may elicit brain wave activity. Each user may wear an EEG system. For instance: (a) a first user may wear a first EEG system 960 that includes EEG sensor 991 and EEG electrodes 970, 971, 972; (b) a second user may wear a second EEG system 961 that includes EEG sensor 992 and EEG electrodes 973, 974, 975; and (c) a third user may wear a third EEG system 962 that includes EEG sensor 993 and EEG electrodes 976, 977, 978. Each EEG sensor may also include a motion sensor (e.g., 984, 985, 986) that comprises a three-axis digital accelerometer and a three-axis digital gyroscope (or that comprises an IMU). Readings from the motion sensors may be employed to remove motion-caused artifacts in the EEG readings. Each EEG system may also include a wireless module (e.g., 981, 982, 983) that wirelessly transmits raw EEG readings or attention predictions to computer 930. A wireless module 999 in computer 930 may receive these wireless transmissions. Computer 930 (or microcontrollers in the respective EEG systems) may detect patterns in the EEG readings, and may, based on these patterns, predict which sound each user is paying attention to.

Practical Applications

This invention has many practical applications.

In some cases, after the system determines which external sound a user is paying attention to, the system alters external sounds that the user would otherwise hear, in order to make sound of interest easier to hear, or easier to pay attention to, or more memorable. For instance, the sound of interest may be amplified while other sounds are diminished in amplitude (e.g., by active or passive noise cancellation). Or, for instance, the dynamic range of the sound of interest may be enlarged, while the dynamic range of other sounds may be reduced. Or, for instance, other sound effects may be employed to alter the sound of interest to make it more perceptually prominent.

A hearing aid may employ this approach (of perceptually augmenting a sound of interest) to enable a hearing impaired user to easily hear a voice that the user is paying attention to and to diminish other sounds. This may be particularly helpful in a noisy context such as loud party or busy restaurant.

In other cases, after the system determines which external sound a user is paying attention to, the system alters external sounds that the user would otherwise hear, in order to make one or more other sounds (to which the user should be paying attention) more perceptually prominent. For instance, the system may detect that a user is listening to a first sound, when the user should instead be listening to an important announcement. The system may alter the announcement and other sounds, in order to make the announcement more perceptually prominent. For instance, the system may amplify the announcement and reduce the volume of other sounds (including the sound to which the user is then paying attention). Or, for instance, the system may increase the dynamic range of the announcement and reduce the dynamic range of other sounds (including the sound to which the user is then paying attention). Or, for instance, other sound effects (e.g., reverb or pitch-shifting) may be employed to make the announcement more perceptually prominent.

In some implementations, these alterations to external sounds (in order to perceptually augment the sound of interest or another sound) may be made concurrently with the sound modifications that elicit EEG patterns indicative of which audio channel the user is paying attention to.

In some cases, one or more computers alter an HCI (human-computer interaction) in a manner that depends on the detected sound of interest—that is, the sound to which the user is paying attention.

For instance, if a computer detects that a user is paying attention to a particular audio stream, the computer may recommend to the user—or present to the user—other similar or related audio streams.

In some cases, the system detects that a user is paying attention to a particular voice and performs a voice recognition algorithm to recognize content of words spoken the voice. The system may then recommend to the user—or present to the user—information related to the content. For instance, a computer may cause one or more input/output (I/O) devices to present conversation-relevant supporting information to the user (such as by pulling up pictures from the user's last vacation on the user's phone screen while—or after—the user pays attention to a conversation about a vacation).

In some cases, the system detects that a user is paying attention to words spoken by a person and performs a voice recognition algorithm to identify the person who is speaking the words. A computer may then cause one or more I/O devices to present to the user information about that person (i.e., the person to whose words the user is paying attention).

In some cases, the system detects that a user is paying attention to a particular voice and performs a voice recognition algorithm to recognize content of words spoken the voice. A computer may then store a transcript of the words spoken by that voice, and may later cause one or more I/O devices to present to the user the entire transcript or selected portions of the transcript. For instance, the computer may cause the one or more I/O devices to remind the user of—or to present to the user a transcript of—the portions (of a person's speech) to which the user was paying attention. Or, for instance, the computer may cause the one or more I/O devices to remind the user of—or to present to the user a transcript of—the portions (of a person's speech) to which the user was not paying attention.

In some cases, the system detects that a user is not paying attention to an important item of information that is spoken to the user, and then reminds the user regarding that important item of information. For instance, a computer may: (a) detect that a user is not paying attention to words spoken by a particular person; (b) perform voice recognition to recognize the content of the words; (c) determine that an item of information in the content is important; and (d) cause one or more I/O devices to remined the user regarding the item of information. For example, the system: (a) may detect that a user is not paying attention to the name of a new person while being introduced to that new person; and (b) may later remind the user regarding the new person's name.

Memory

This invention is not limited to tracking attention. In some cases, a computer detects which sound contains content that a user is committing to memory or is likely to remember. To achieve this: (a) the external sounds may be modified in such a way as to elicit EEG patterns that are indicative of which sound has content that the user is committing to memory or is likely to remember; (b) a computer may analyze EEG readings taken while a user listens to the modified sounds; and (b) may predict, based on patterns in these EEG readings, which sound contains content that the user is committing to memory or is likely to remember. The modifications to external sounds for this purpose may be different from those employed for tracking attention. Likewise, the EEG patterns that are indicative of which sound has content that the user is committing to memory (or is likely to remember) may be different from the patterns indicative of attention.

Example A

The following 12 paragraphs describe an illustrative embodiment of this invention. We sometimes call this embodiment "Example A".

In Example A, an EEG signal is used to determine the sound that a person is attending to. For instance, this invention may identify which human speaker a user is attending to in a multi-speaker environment.

In Example A, incoming sounds are modified in slight, unexpected ways, to elicit an event-related potential (ERP). This potential may be measured with an EEG and may occur in response to a stimulus (e.g., sound), which changes when the user is paying attention to it. This ERP may be a P300.

In Example A, the sound is altered in real-time, such as by headphones. This invention overlays natural sounds with slight, unexpected modifications to evoke the ERP P300, and then, based on the ERP P300, identifies the sound source that a user is attending to.

In some versions of Example A, the types of alterations (to the sound) may be learned and adapted, such as to give stronger signals in harder conditions, and to learn the types of alterations that elicit a P300 and are minimally disruptive. Several ERPs may be elicited rapidly, and their responses may be averaged to get a better signal-to-noise ratio (SNR). Multiple different sound sources may be altered with slightly varying timing patterns to isolate the single source the user is attending to.

In Example A, an array of microphones on the head may create acoustic beamformers that selectively pick up angles of incoming sounds. These sounds may be fed through a processor that works in real-time to modify only that slice of the audio (say, changing its volume rapidly or equalizing it differently) and to re-mix it with sounds from the user's environment. The system may iterate through different beams of incoming sound and elicit changes in one sound at a time, correlating the changes with measured ERPs to find the attended sound. The system may filter or amplify sounds based on the user's attention.

In Example A, the system elicits potentials rather than passively monitoring naturally occurring ones. This may increase control over system SNR and identification time. It may also enable using search techniques over sound sources, by allocating elicit potentials to sources with higher probability of attention.

In Example A, the system times the elicited potentials. This enables the analysis on the EEG to be straightforward and power-efficient.

In some versions, Example A involves beam-forming sweeps with sound modification.

In Example A, natural sound objects may be altered in real-time to elicit measurable changes in EEG, to measure attention. For instance, which sound a user is paying attention to may be measured.

In Example A, a system performs accurate and non-invasive identification of the sound source that an individual is attending to. For example, in a crowded room, this technique may be used to identify the voice(s) of the person or people that a user is trying to listen to and selectively amplify these voice(s) over of the sea of voices. In some implementations, changes in neural activity are elicited by altering sources directly and measuring event-related potentials.

In Example A, auditory attention measurement may be employed to enhance a user's productivity or focus. For instance, the auditory attention measurement may be used: (a) to diminish and alter sounds or music the user is not attending to so they do not impede the user's focus; (b) to alter sounds that the user is focused on to improve the user's memory of them or to provide the user subtle information; or (c) to provide a backbone to measure and build models of the sounds that distract or engage the user and to use to it improve interaction design and inform media creation.

In Example A, the hardware of the system may include, among other things, a circuit board that performs acoustic beamforming and real-time compression/equalization of incoming sounds using an Analog Devices® integrated chip. This may enable real-time sound modification and source separation based on angle. A microcontroller on board may receive information from an off-the-shelf EEG such as OpenBCI® over SPI (serial peripheral interface) and may update the beamforming patterns. The system hardware may modify sound sources by direction of arrival to identify the beam of interest, and selectively amplify it.

Example A, which is described in the preceding 12 paragraphs, is a non-limiting example of this invention. This invention may be implemented in many other ways.

Computers

In illustrative implementations of this invention, one or more computers (e.g., servers, network hosts, client computers, integrated circuits, microcontrollers, controllers, microprocessors, field-programmable-gate arrays, personal computers, digital computers, driver circuits, or analog computers) are programmed or specially adapted to perform one or more of the following tasks: (1) to control the operation of, or interface with, hardware components of an auditory attention tracking system, including any microphones, speakers, and EEG sensors; (2) to perform beamforming or other sound separation; (3) to modify audio signals; (4) to detect patterns in EEG readings; (5) to predict, based on patterns detected in EEG readings, which sound a user is paying attention to; (6) to alter one or more audio signals to make an audio signal of interest (to which a user is paying attention) more perceptually prominent; (7) to alter one or more audio signals to make an audio signal (to which a user is not paying attention) more perceptually prominent; (8) to alter a human-computer interaction, based on which sound a user is paying attention to or based on the content of that sound; (9) to receive data from, control, or interface with one or more sensors; (10) to perform any other calculation, computation, program, algorithm, or computer function described or implied herein; (11) to receive signals indicative of human input; (12) to output signals for controlling transducers for outputting information in human perceivable format; (13) to process data, to perform computations, and to execute any algorithm or software; and (14) to control the read or write of data to and from memory devices (tasks 1-14 of this sentence being referred to herein as the "Computer Tasks"). The one or more computers (e.g., 208, 230, 232, 930) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, machine readable media, with instructions encoded thereon for one or more computers to perform one or more of the Computer Tasks. In some implementations, these one or more media are not transitory waves and are not transitory signals.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, one or more devices (e.g., 208, 230, 231, 232, 930, 991, 992, 993) are configured for wireless or wired communication with other devices in a network.

For example, in some cases, one or more of these devices include a wireless module for wireless communication with other devices in a network. Each wireless module (e.g., 981, 982, 983, 999) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g., 208, 230, 232, 930) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To "attend" to means to pay attention to. For instance, if a user is attending to a sound, then the user is paying attention to that sound.

To compute "based on" specified data means to perform a computation that takes the specified data as an input.

The term "comprise" (and grammatical variations thereof) shall be construed as if followed by "without limitation". If A comprises B, then A includes B and may include other things.

As used herein, to increase or decrease volume of a digital audio signal means to alter the digital signal in such a way as to increase or decrease, respectively, the volume of a physical sound that would result from playing the digital signal. As used herein, to increase or decrease perceptual prominence of a digital audio signal means to alter the digital signal in such a way as to increase or decrease, respectively, the perceptual prominence of a physical sound that would result from playing the digital signal. As used herein, to add a sound effect to a digital audio signal means to alter the digital signal in such a way as to add the sound effect to a physical sound that would result from playing the digital signal.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

"EEG" means electroencephalography.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in such as manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Each of the following is a non-limiting example of an I/O device: a touch screen, other electronic display screen, keyboard, mouse, microphone, digital stylus, speaker, and video projector.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

As used herein, to "play" or "playback" means to output sound in a manner that is audible to a human listener. For instance, to "playback" an audio file means to output, in a manner audible to a human listener, sound represented by the audio file. As used herein, the term "playback" does not imply that a listener has heard a sound before.

As used herein, to "remix" means to mix. As used herein, the term "remix" does not imply that mixing occurred previously. As used herein, the term "remix" does not imply that mixing is being repeated. As used herein, the term "remix" does not imply that sounds being remixed were previously part of a combined sound. As used herein, the term "remix" does not imply that sounds being remixed have remained unchanged after being separated.

As used herein, the term "set" does not include a group with no elements.

As used herein, "speaker" means an audio transducer that is configured to output sound. A human being is not a "speaker", as that term is used herein.

Unless the context clearly indicates otherwise, "some" means one or more.

As used herein, a "subset" of a set consists of less than all of the elements of the set.

The term "such as" means for example.

"2D" means two-dimensional.

"3D" means three-dimensional.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) taking measurements of sounds, which sounds are from sources external to a user (external sounds); (b) performing sound separation to produce a first set of digital audio signals, each digital audio signal in the first set being derived from a different portion of the external sounds than each other audio signal in the first set; (c) making modifications to one or more of the digital audio signals in the first set to produce one or more modified digital audio signals; (d) mixing the one or more modified digital audio signals with each other and/or with other audio signals in the first set, in order to produce an altered set of digital audio signals; (e) outputting the altered set of audio signals as sound waves (altered sounds) that are audible to the user; and (f) taking electroencephalography (EEG) measurements of neural responses of the user to the altered sounds, detecting patterns in the EEG measurements, and predicting, based on the patterns detected, which sound the user is paying attention to. In some cases: (a) the measurements of sound are taken by respective microphones; and (b) the sound separation comprises generating the audio signals in the first set, based on the measurements of sound taken by the respective microphones, the generating being performed in such a way that each digital audio signal in the first set is derived from measurements taken by only one of the microphones. In some cases: (a) the measurements of sound are taken by an array of microphones; and (b) the sound separation involves beamforming. In some cases, the patterns in the EEG measurements, on which the predicting of attention is based, include event-related potentials. In some cases, the modifications comprise altering dynamic range of at least one audio signal. In some cases, the modifications comprise audio equalization. In some cases, the modifications comprise increasing volume of a first audio signal and decreasing volume of at least one other audio signal. In some cases, the modifications comprise increasing perceptual prominence of a first audio signal and decreasing perceptual prominence of at least one other audio signal. In some cases, the modifications include adding a reverb sound effect to, and/or changing pitch in, at least one audio signal. In some cases, the method also comprises: (a) further modifying the altered set of audio signals to create a second altered set of audio signals, the further modifying being performed in such a way as to increase volume of the sound that the user is paying attention to and to decrease volume of other sounds; and (b) outputting the second altered set of audio signals as sound waves that are audible to the user. In some cases, the method further comprises: (a) detecting content of the sound that the user is paying attention to; and (b) providing information to the user, which information is directly or indirectly associated, by one or more computers, with the content of the sound. In some cases, the method further comprises: (a) after detecting the sound that the user is paying attention to, detecting content of another sound; and (b) providing information to the user, which information is directly or indirectly associated, by one or more computers, with content of the other sound to which the user is not paying attention. Each of the cases described above in this paragraph is an example of the method described in the first sentence of this paragraph, and is also an example of an embodiment of this invention that may be combined with other embodiments of this invention.

In some implementations, this invention is a system comprising: (a) a plurality of microphones; (b) one or more signal processors; (c) one or more speakers; (d) one or more electroencephalography (EEG) sensors; and (e) one or more computers; wherein (i) the microphones are configured to take measurements of sounds, which sounds are from sources external to a user (external sounds), (ii) the one or more signal processors are configured (A) to perform sound separation to produce a first set of digital audio signals, each digital audio signal in the first set being derived from a different portion of the external sounds than each other audio signal in the first set, (B) to make modifications to one or more of the digital audio signals in the first set to produce one or more modified digital audio signals, and (C) to mix the one or more modified digital audio signals with each other and/or with other audio signals in the first set, in order to produce an altered set of digital audio signals, (iii) the one or more speakers are configured to output the altered set of audio signals as sound waves (altered sounds) that are audible to the user, (iv) the one or more EEG sensors are configured to take EEG measurements of neural responses of the user to the altered sounds, and (v) the one or more computers are programmed (A) to detect patterns in the EEG measurements, and (B) to predict, based on the patterns detected, which sound the user is paying attention to. In some cases, the one or more signal processors are configured to perform the sound separation in such a way that: (a) different audio signals in the first set are derived from measurements taken by different microphones in the plurality of microphones; and (b) each digital audio signal in the first set is derived from measurements taken by only one microphone. In some cases, the sound separation involves beamforming. In some cases, the patterns in the EEG measurements, on which the predicting of attention is based, include event-related potentials. In some cases, the modifications comprise altering dynamic range of at least one audio signal. In some cases, the modifications comprise increasing volume of a first audio signal and decreasing volume of at least one other audio signal. In some cases: (a) the one or more signal processors are configured to further modify the altered set of audio signals, in such a way as to create a second altered set of audio signals by increasing volume of the sound that the user is paying attention to and decreasing volume of other sounds; and (b) the one or more speakers are configured to output the second altered set of audio signals as sound waves that are audible to the user. In some cases: (a) the system further comprises one or more input/output devices; and (b) the one or more computers are further programmed (i) to detect content in an audio signal that represents the sound that the user is paying attention to, and (ii) to cause the one or more input/output devices to provide information to the user, which information is directly or indirectly associated, by the one or more computers, with the content. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A method comprising:
   (a) taking measurements of sounds, which sounds are from sources external to a user and correspond to external sounds;
   (b) performing sound separation to produce a first set of audio signals, each audio signal in the first set being derived from a different source of the external sounds than each other audio signal in the first set;
   (c) selectively modifying the audio signals in the first set to intentionally elicit an event-related potential (ERP) in brain activity of the user, wherein (c) is performed so that at least a first audio signal in the first set is intentionally modified to produce the ERP and one or more remaining audio signals in the first set are not modified to produce the ERP;
   (d) mixing at least the first audio signal with the one or more remaining audio signals in order to produce an altered set of audio signals;
   (e) outputting the altered set of audio signals as sound waves audible to the user; and
   (f) taking electroencephalography (EEG) measurements of neural responses of the user to the sounds waves, detecting one or more patterns in the EEG measurements including the ERP, and predicting, based on the one or more patterns detected, that the user is paying attention to a sound of the measured sounds that corresponds to at least the first audio signal.

2. The method of claim 1, wherein:
   (a) the measurements of sounds are taken by respective microphones; and
   (b) the sound separation comprises generating the audio signals in the first set, based on the measurements of sounds taken by the respective microphones, the generating being performed in such a way that each audio signal in the first set is derived from measurements taken by only one of the microphones.

3. The method of claim 1, wherein:

the measurements of sounds are taken by an array of microphones; and the sound separation involves beamforming.

4. The method of claim 1, wherein:

the ERP is a P300 event-related potential, and the P300 ERP includes a peak between 250 and 500 milliseconds after an altered sound in the sound waves.

5. The method of claim 1, wherein (c) includes altering a dynamic range of at least the first audio signal.

6. The method of claim 1, wherein (c) includes audio equalization of at least the first audio signal.

7. The method of claim 1, wherein after (f) the method includes: increasing volume of at least the first audio signal and decreasing volume of the one or more remaining audio signals.

8. The method of claim 1, wherein after (f) the method includes: increasing perceptual prominence of at least the first audio signal and decreasing perceptual prominence of the one or more remaining audio signals.

9. The method of claim 1, wherein (c) includes adding a reverb sound effect to, and/or changing pitch in, least the first audio signal.

10. The method of claim 1, wherein the method also comprises:

further modifying the altered set of audio signals to create a second altered set of audio signals, the further modifying being performed in such a way as to increase volume of the sound that the user is paying attention to and to decrease volume of other sounds; and outputting the second altered set of audio signals as sound waves that are audible to the user.

11. The method of claim 1, wherein the method further comprises:

detecting content of the sound that the user is paying attention to; and providing information to the user, which information is directly or indirectly associated, by one or more computers, with the content of the sound.

12. The method of claim 1, wherein the method further comprises:

after detecting the sound that the user is paying attention to, detecting content of another sound; and providing information to the user, which information is directly or indirectly associated, by one or more computers, with content of the other sound to which the user is not paying attention.

13. A system comprising:

(a) a plurality of microphones;
(b) one or more signal processors;
(c) one or more speakers;
(d) one or more electroencephalography (EEG) sensors; and
(e) one or more computers;

wherein (i) the microphones are configured to take measurements of sounds, which sounds are from sources external to a user and correspond to external sounds, (ii) the one or more signal processors are configured (A) to perform sound separation to produce a first set of audio signals, each audio signal in the first set being derived from a different source of the external sounds than each other audio signal in the first set, (B) to selectively modify the audio signals in the first set to intentionally elicit an event-related potential (ERP) in brain activity of the user, wherein (c) is performed so that at least a first audio signal in the first set is intentionally modified to produce the ERP and one or more remaining audio signals in the first set are not modified to produce the ERP, and (C) to mix at least the first audio signal with the one or more remaining audio signals in order to produce an altered set of audio signals;

(iii) the one or more speakers are configured to output the altered set of audio signals as sound waves audible to the user, (iv) the one or more EEG sensors are configured to take EEG measurements of neural responses of the user to the sound waves, and (v) the one or more computers are programmed (A) to detect one or more patterns in the EEG measurements including the ERP, and (B) to predict, based on the one or more patterns detected, that the user is paying attention to a sound of the measured sounds that corresponds to at least the first audio signal.

14. The system of claim 13, wherein the one or more signal processors are configured to perform the sound separation in such a way that:

(a) different audio signals in the first set are derived from measurements taken by different microphones in the plurality of microphones; and (b) each audio signal in the first set is derived from measurements taken by only one microphone.

15. The system of claim 13, wherein the sound separation involves beamforming.

16. The system of claim 13, wherein:

the ERP is a P300 event-related potential, and the P300 ERP includes a peak between 250 and 500 milliseconds after an altered sound in the sound waves.

17. The system of claim 13, wherein (ii)(b) comprises altering a dynamic range of at least the first audio signal.

18. The system of claim 13, wherein (ii)(b) comprises increasing the volume of at least the first audio signal.

19. The system of claim 13, wherein:

(a) the one or more signal processors are configured to further modify the altered set of audio signals, in such a way as to create a second altered set of audio signals by increasing volume of the sound that the user is paying attention to and decreasing volume of other sounds; and (b) the one or more speakers are configured to output the second altered set of audio signals as sound waves that are audible to the user.

20. The system of claim 13, wherein:

(a) the system further comprises one or more input/output devices; and (b) the one or more computers are further programmed (i) to detect content in an audio signal that represents the sound that the user is paying attention to, and (ii) to cause the one or more input/output devices to provide information to the user, which information is directly or indirectly associated, by the one or more computers, with the content.

* * * * *